Dec. 12, 1967  H. J. WOODCOCK  3,357,243
FLOW METERS
Filed April 1, 1965  2 Sheets-Sheet 2

INVENTOR.
HENRY J. WOODCOCK
BY Harry M. Saragovitz,
Edward J. Kelly, Herbert Berl
& James W. Colvin
ATTORNEYS

3,357,243
FLOW METERS
Henry J. Woodcock, 305 Raleigh Ave.,
Hampton, Va. 23361
Filed Apr. 1, 1965, Ser. No. 444,878
3 Claims. (Cl. 73—194)

The invention disclosed herein may be manufactured and used by or for the Government for governmental purposes without payment to me of any royalty thereon.

This invention relates to improvements in flow meters and particularly to flow meters for measuring the flow of liquids through restricted conduits such as water or fuel pipes.

Meters for measuring the flow of liquid through restricted conduits or pipes are usually in the form of pressure responsive devices, such as Pitot tubes or Venturi sections, or variable chamber devices having rotating or reciprocating parts. The pressure responsive devices, while acceptable under certain circumstances, tend to be inaccurate, particularly at high or low fluid velocity, and obstruct the flow of fluid to an objectionable degree in many cases. The variable chamber devices not only obstruct the fluid flow and cause pulsations in the fluid stream but are expensive and subject to wear and malfunctioning. Some of these, for example the impeller type, also tend to become inaccurate if the velocity of the fluid goes above or below a predetermined range.

It is therefore among the objects of the present invention to provide a fluid flow meter which is highly accurate over a wide range of flow velocities which does not restrict the flow of fluid through a conduit or cause pulsations in the fluid stream.

A further object resides in the provision of an improved flow meter which has no moving parts and can be installed in a fluid conduit to constitute a part of the conduit without materially increasing the weight of the installation.

A still further object resides in the provision of an improved flow meter which automatically and constantly provides an accurate indication of the rate of flow of liquid through a conduit.

Figure 1:
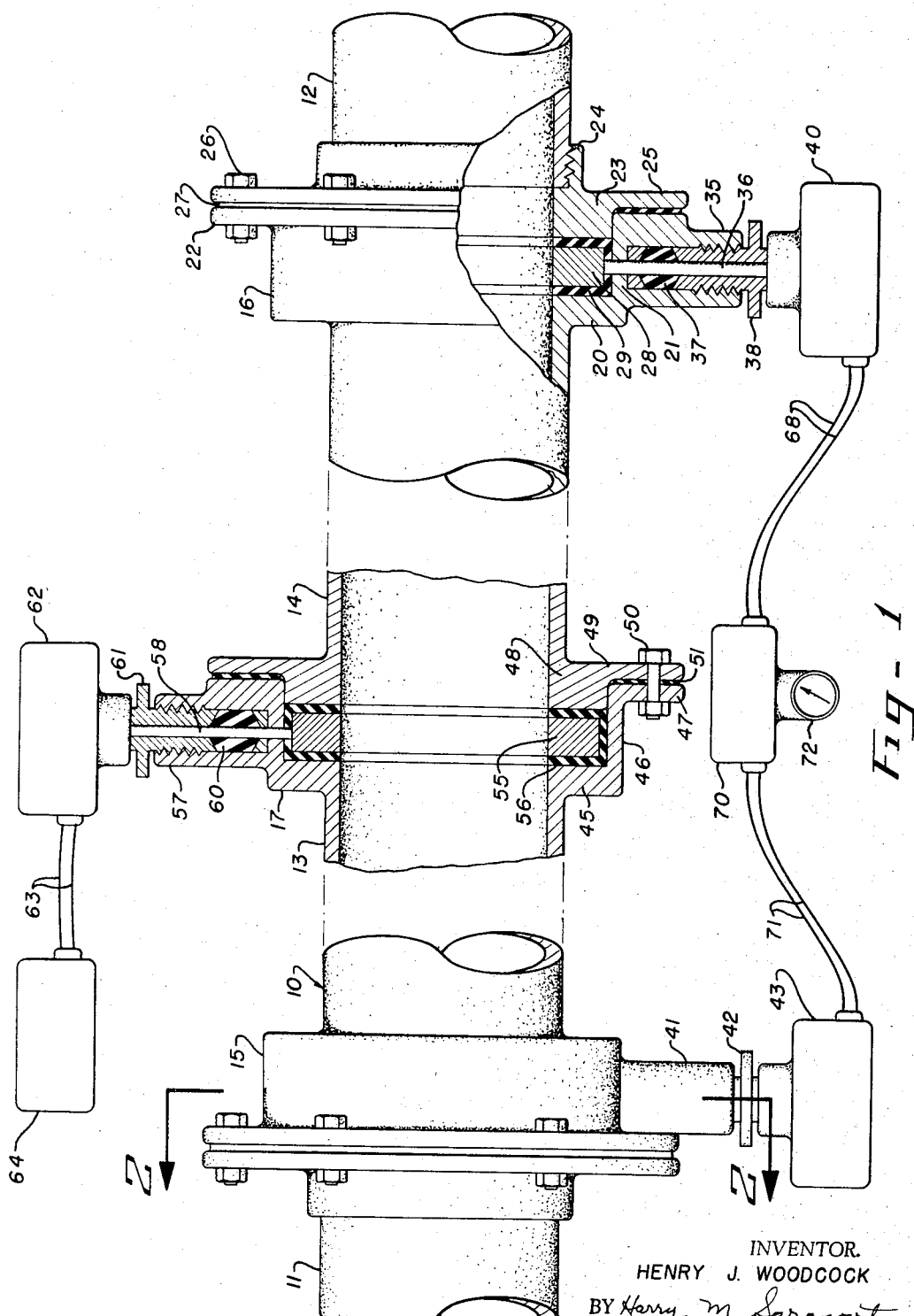
Figure 2:
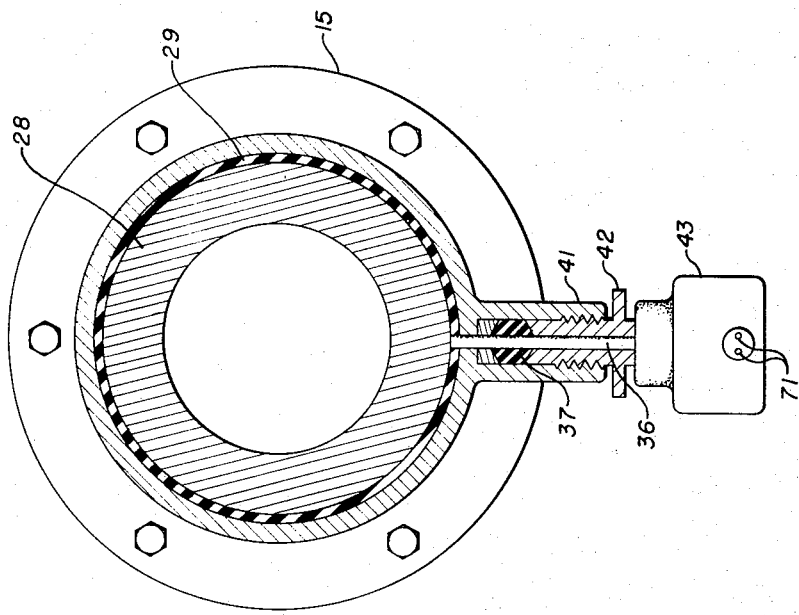

Other objects and advantages will become apparant from a consideration of the following specification and the appended claims in conjunction with the accompanying drawings wherein:

FIG. 1 is a somewhat diagrammatic side elevational view of a fluid flow meter illustrative of the invention with a portion broken away and shown in cross section to better illustrate the construction of the device; and FIG. 2 is a transverse cross-sectional view taken substantially on a plane indicated by the line 2—2 on FIG. 1.

With continued reference to the drawings, the numeral 10 generally indicates the flow meter set in a gap in a fluid conduit the end portions of which are indicated at 11 and 12. The meter comprises a cylindrical barrel portion provided in two axially aligned sections 13 and 14 joined to the corresponding conduit end portions by flange assemblies 15 and 16, the two barrel sections being joined by a similar flange assembly 17. The meter barrel has a bore carefully dimensioned to the same size of the bore of the conduit and smoothly finished to minimize fluid friction resisting the flow of fluid therethrough.

The flange assembly 16 comprises a cup shaped flange formed on one end of the barrel section 14 and including an annular radial portion 20, a cylindrical portion 21 extending from the outer edge of the annular portion 20 and a radial annular portion 22 extending outwardly from the end of cylindrical portion 21 remote from radial portion 20. The flange assembly further comprises an annular member having an inner ring portion 23 from which extends an internally screw threaded, cylindrical portion 24 receiving the externally screw threaded end of conduit end portion 12 and a radial flange 25 which overlies and is opposed to the flange 22. The flanges 22 and 25 are provided with angularly spaced apart bolt holes receiving clamp bolts 26 which secure the opposed parts of the flange assembly together and, if desired, a flat ring of packing material 27 may be interposed between the flanges 22 and 25 to prevent leakage.

The cylindrical flange portion 16 provides internally thereof an annular recess, which may be of substantially rectangular cross-sectional shape and a resonator ring 28 is disposed in this recess. The ring 28 is also of substantially rectangular cross-sectional shape and is smaller than the recess in which it is received, the internal diameter of the ring being precisely the same as the diameter of the bore of the barrel sections 13 and 14. An annular sleeve 29 of elastic material, such as natural or synthetic rubber, receives the ring 28 and is of generally U-shaped cross section so that it fills the space between the ring 28 and the recess in flange portion 21 and maintains the ring centered in the recess.

The ring 28 is continuous and formed of a resilient material, such as steel. It is dimensioned and tempered to have a predetermined natural frequency of vibration or resonance.

The flange assembly 15 is similar in all respects to the flange assembly 16, described above, and includes a ring shaped resonator, not illustrated but identical to the resonator 28 and which may be hereinafter referred to as resonator $28^1$.

A hollow cylindrical extension or boss 35 projects radially from the cylindrical portion 21 of flange 16 and portion 21 has an opening therein in alignment with the bore of the boss. A transducer actuator pin 36 extends through boss 35, flange portion 21 and elastic sleeve 29 and bears at one end against the outer surface of ring 28. A fluid seal is provided between the pin 36 and boss 35 by suitable sealing means illustrated as an annular packing 37 compressed by a gland unit 38 threaded into the outer end of boss 35. A transducer pickup 40 is mounted on the outer end of gland nut 38 and receives the outer end of pin 36 for a purpose to be later described.

A hollow cylindrical projection or boss 41 extends radially from the cylindrical portion of flange assembly 15 and receives a gland nut 42, similar to gland nut 38, in its outer end. A transducer pickup 43 is mounted on the gland nut 42 and connected to the ring in flange assembly 15 by a transducer actuator pin similar to the pin 36.

Flange assembly 17 is generally similar to the flange assemblies 15 and 16 except that it has no screw threaded joint. A part of the flange assembly is formed integrally on one end of the barrel section 13 and includes an annular radial shoulder 45, a cylindrical portion 46 extending axially from the outer edge of shoulder 45 and an annular flange portion 47 projecting radially outward from the end of portion 46 remote from section 45. The complementary portion of assembly 17 comprises an annular shoulder 48, of rectangular cross-sectional shape, surrounding the corresponding end of barrel section 14, and an annular flange 49. The flanges 47 and 49 are provided with angularly spaced apart bolt holes for the bolts 50 which clamp the two sections 13 and 14 of the barrel together. If desired a flat packing ring 51 may be interposed between the flanges 47 and 49 to provide a fluid seal between the flanges. The cylindrical formation 46 provides an annular internal recess of substantially rectangular cross sectional shape which receives a resonator ring 55, similar to the rings 28 and $28^1$. A sleeve 56 of elastic material surrounds the ring 55 and has a U-shaped cross section so that it covers both sides and the outer surface of the associated ring and fills the space between the ring and the walls of the ring reeciving recess, thereby centering the ring in the recess with the inner surface of the ring flush with the walls of the bores in barrel sections 13 and 14.

A hollow cylindrical projection or boss 57 extends radially from the formation 46 in communication with the recess in this formation and an actuator pin 58 extends through boss 57 and sleeve 56 and bears at one end on ring 55. Pin 58 is surrounded by a packing 60 within boss 57 and the packing is compressed by a gland nut 61 threaded into the outer end of the boss. An input transducer 62 is mounted on the outer end of gland nut 61 and connected by suitable leads 63 to a signal generator 64.

The pickup transducer 40 is connected by leads 68 to a counter or comparator 70 and the pickup 43 is connected by leads 71 to the opposite side of the comparator. The output from the unit 70 is fed to a calibrated meter 72 which may have a suitable indicator, such as a dial and pointer, directly indicating the volumetric flow of liquid through the flow meter.

In the operation of the device the input transducer 62, when actuated by the signal generator 64, imparts a longitudinal vibration to the pin 58 which, in turn, imparts the vibration to the ring 55. The frequency and amplitude of this vibration should be such as to cause the ring 55 to vibrate at its natural frequency and at a predetermined amplitude consistent with the total sensitivity of the meter. If the meter barrel is filled with liquid, vibrations of the ring 55 will be transmitted through the liquid to the rings 28 and $28^1$, transmission of vibration through the material of the meter barrel being substantially avoided by the elastic sleeve 56 and the sleeves in the flange assemblies 15 and 16. If the liquid in the meter barrel is stationary the vibrations will be transmitted from ring 55 to rings 28 and $28^1$ in unison since these rings are exactly the same distance from ring 55. The rings 28 and $28^1$ will therefore vibrate in phase and the signals picked up by the transducers 40 and 43 will exactly cancel out in the comparator 70 and the meter indicator 72 will read zero. If the fluid moves through the meter barrel the impulses from ring 55 to the downstream terminal ring will be accelerated and the transmission from ring 55 to the upstream terminal ring will be retarded. Thus vibrations of the terminal rings 28 and $28^1$ will be thrown out of phase with each other an amount depending on the velocity of liquid flow through the meter barrel. This phase differential develops energy in the counter or comparator 70 in proportion to the flow velocity and this energy fed to the indicator 72. Since the indicator is calibrated for the cross sectional area of the meter barrel, the distance between the vibratory rings, fluid friction through the barrel and any other factors affecting the measurement of fluid flow, the fluid velocity signal fed to the indicator will provide a direct reading in volumetric fluid flow.

The apparatus described above is especially designed to measure fluid flow in both directions through the conduit. In a case where the flow of fluid is consistently in the same direction a simplified arrangement using two rings only, would be effective. In such a case, both the signal input generator and a signal pickup would be connected to one ring and a signal pickup only connected to a second ring spaced along the barrel from the one ring. The distance between the rings will depend on the lowest velocity that it is desired to measure and the desired degree of accuracy of the measurement. Considering that, because of the elastic insulation of the rings from the meter barrel by imbedding the rings in sleeves or annuli of elastic material, the signal is transmitted solely by the liquid in the barrel, with the liquid in a static condition a definite time interval will be required to transmit a signal impulse from the input ring to the pickup ring. This time interval will depend on the distance between the rings and the sound transmitting modulus of the liquid. This time interval will cause a slight out-of-phase condition to exist between the input cyclic impulse signal and the picked up signal at the ring remote from the signal input and a sensitive instrument can detect this out-of-phase condition and indicate its magnitude. If now the fluid (liquid) flows in a direction from the signal pickup or output station toward the signal input station the transmission of signal impulses between the two stations will be further retarded and the out-of-phase condition between the cyclic impulse signal at the input station and at the pickup station, when measured, provides an indication of the rate of flow of fluid between the stations. With the detecting and indicating instruments calibrated to the cross sectional area of the bore of the barrel and to the signal transmission modulus of the particular fluid, a direct indication of fluid flow in terms of volume units per time unit can be obtained.

Considering the case where the fluid is static in the bore of the barrel, if the barrel has sufficient length and the detecting and indicating instruments sufficient sensitivity, the density of any fluid in the bore can be indicated. This is because the modulus of the transmission of impulses, such as sound waves, through a liquid varies directly with the density of the liquid. By detecting the out-of-phase relationship between the input and output signals the time interval for the transmission of a signal impulse through the liquid from the input to the output station can be determined and, knowing the distance between the stations, the modulus of transmission of sound through the liquid can be calculated. With the modulus known, the density can be calculated or determined from tables or a suitable graph. An instrument could be devised to compute the density and indicate it directly if there were sufficient need for such an instrument to justify its development.

In order to convert the system hereinabove described in connection with the accompanying drawings it would be necessary only to remove the signal input apparatus from the center ring of the illustrated arrangement and apply it to one of the end rings. The pickup and comparator apparatus would remain as illustrated.

The flow meter can be designed for any desired size of fluid conduit but would be particularly useful for the small sizes such, for instance, as from one inch to six inches diameter since it is easy to install in conduits in this range and this is the range of conduit sizes for which extreme accuracy of flow measurement is usually required. To install the meter it is necessary only to remove a section of conduit substantially equal in length to the length of the meter, screw thread the ends of the conduit, apply the end flanges to the threaded ends of the conduit and then install the remainder of the meter in the apparent manner.

While a particular mechanical embodiment of the invention has been herein above described and illustrated in the accompanying drawings, it is to be understood that the scope of the invention is in no way limited to the embodiment so described and illustrated but is commensurate with the scope of the appended claims.

I claim:
1. A meter for measuring the rate of flow of liquid through a conduit comprising an elongated barrel adapted to be connected into a conduit and having a bore of uniform cross-sectional area, resonant rings formed of resilient material set into said barrel at spaced apart locations along said barrel and having their inner surfaces flush with the surface of said bore, said resonant rings dimensioned and tempered to have a predetermined natural frequency, means effective to impart a cyclic impulse signal to a first one of said resonant rings which completely encircles the fluid medium passing through the barrel whereby vibrations due to said impulse signal are uniformly transmitted around the periphery of the fluid medium, means effective to pick up from a second one of said resonant rings which completely encircles the fluid medium and uniformly receive said vibrations around the periphery of the fluid medium due to the cyclic impulse signal transmitted from said first one of said resonant rings to said second one of said resonant rings through the body of liquid between said resonant rings, means effective to pick up the cyclic impulse signal at a location spaced from said second one of said resonant rings, and means effective to compare the signals picked up at the spaced apart locations.

2. A liquid flow meter for measuring the flow of liquid through a conduit comprising an elongated barrel adapted to be connected into the conduit and having a bore of uniform cross-sectional area, resonant rings formed of resilient material set into said barrel, said resonant rings dimensioned and tempered to have a predetermined natural frequency, one of said resonant rings positioned at the mid-length location and one of said resonant rings positioned at each end of said barrel and having their inner surfaces flush with the wall of the bore of said barrel, each said resonant ring completely encircling the liquid medium passing through said barrel whereby the vibrations of one of said resonant rings are uniformly transmitted around the periphery of said liquid medium and received uniformly around the periphery of said liquid medium by said resonant ring positioned at each end of said barrel, a sleeve of elastic material surrounding each said resonant ring and providing vibration insulation between each said resonant ring and said barrel, means engaging the resonant ring at the mid-length location of said barrel for imparting a cyclic impulse signal to said resonant ring, said signal being transmitted through liquid in said barrel at transmission speeds affected by the rate of flow of the liquid through the bore of said barrel, pickup devices respectively engaging the resonant rings at the ends of said barrel to pick up the signals transmitted to these resonant rings through the liquid in said barrel, and comparator means connected between said pickup means and effective to determine by the difference in the signals picked up by said pickup devices the rate of flow of liquid through said barrel.

3. A liquid flow meter comprising an elongated barrel having a bore of substantially uniform cross-sectional area of the flow of liquid therethrough, resonant rings formed of resilient material carried by said barrel at locations spaced apart therealong with their inner surfaces substantially flush with the wall of said bore said resonant rings dimensioned and tempered to have a predetermined natural frequency, means insulating said resonant rings vibrationally from said barrel, means engaging one of said resonant rings to impart thereto cyclic impulse signals for transmission through liquid in said bore, signal pickup means engaging two of said resonant rings spaced apart along said bore, each said resonant ring completely encircling the liquid medium passing through said barrel whereby the vibrations of said one of said resonant rings are uniformly transmitted around the periphery of said liquid medium and received uniformly around the periphery of said liquid medium by said two of said resonant rings, and instrument means connected between said pickup means for sensing and indicating differences in the signals picked up by said pickup means to thereby provide an indication of the rate of liquid flow through the bore of said barrel.

References Cited
UNITED STATES PATENTS

| | | | |
|---|---|---|---|
| 2,515,221 | 7/1950 | Henning | 73—194 XR |
| 3,145,564 | 8/1964 | Poole et al. | 73—194 |
| 3,218,851 | 11/1965 | Sipin | 73—194 |
| 3,218,852 | 11/1965 | Scarpa et al. | 73—194 |

RICHARD C. QUEISSER, *Primary Examiner.*

J. J. GILL, *Examiner.*

C. A. RUEHL, *Assistant Examiner.*